United States Patent
Koh

(10) Patent No.: US 7,230,890 B2
(45) Date of Patent: Jun. 12, 2007

(54) APPARATUS AND METHOD FOR STABILIZING OPERATION OF DISC DRIVER IN SECTION FOR SETTING MODE CONVERSION

(75) Inventor: Young-ok Koh, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 11/231,743

(22) Filed: Sep. 22, 2005

(65) Prior Publication Data

US 2006/0013083 A1    Jan. 19, 2006

Related U.S. Application Data

(62) Division of application No. 10/323,744, filed on Dec. 20, 2002, now Pat. No. 7,092,324.

(30) Foreign Application Priority Data

Mar. 6, 2002   (KR) ............................... 2002-11869

(51) Int. Cl.
    *G11B 7/095*   (2006.01)
(52) U.S. Cl. ................. 369/44.32; 369/53.15
(58) Field of Classification Search ............ 369/44.29, 369/44.23, 44.27, 59.14, 44.32, 44.35, 53.1, 369/53.15

See application file for complete search history.

(56) References Cited

U.S. PATENT DOCUMENTS

| | | | | |
|---|---|---|---|---|
| 4,688,202 A | * | 8/1987 | Mukai et al. ............ 369/44.32 |
| 5,388,105 A | * | 2/1995 | Takagi et al. ............... 714/758 |
| 5,448,543 A | * | 9/1995 | Mizokami et al. ....... 369/53.15 |
| 5,831,949 A | * | 11/1998 | Kim ........................ 369/44.35 |
| 6,097,683 A | * | 8/2000 | Ohara et al. ............. 369/53.22 |
| 6,430,129 B1 | * | 8/2002 | Ohara et al. ............... 369/53.1 |
| 6,922,381 B2 | * | 7/2005 | Shidara ................... 369/44.32 |
| 2001/0026508 A1 | * | 10/2001 | Sasaki et al. ............ 369/44.32 |
| 2001/0055247 A1 | * | 12/2001 | Tateishi et al. .......... 369/44.32 |
| 2002/0093891 A1 | * | 7/2002 | Nishigaki ................ 369/44.32 |

* cited by examiner

*Primary Examiner*—Wayne Young
*Assistant Examiner*—Thomas Alunkal
(74) *Attorney, Agent, or Firm*—Staas & Halsey LLP

(57) ABSTRACT

An apparatus which stabilizes an operation of a disc driver in a mode conversion setting section includes a pickup which reads information from a disc that is inserted into the disc driver, a filter which performs a low-pass filtering of a servo error signal that is generated during an operation of the pickup, a selector which selects one of the servo error signal and the low-pass filtered servo error signal from the filter and outputs the selected servo error signal to drive the pickup using the selected servo error signal, and a control signal generator which generates a signal to control the selector to select the low-pass filtered servo error signal in a mode conversion setting section of the disc driver. Accordingly, a defocus and a detrack can be prevented in the mode conversion setting section of the disc driver.

5 Claims, 3 Drawing Sheets

APPARATUS AND METHOD FOR STABILIZING OPERATION OF DISC DRIVER IN SECTION FOR SETTING MODE CONVERSION

CROSS-REFERENCE TO RELATED APPLICATION

This application is a Divisional Application of application Ser. No. 10/323,744 filed Dec. 20, 2002, now U.S. Pat. No. 7,092,324, which claims the benefit of Korean Patent Application No. 2002-11869 filed on Mar. 6, 2002, in the Korean Intellectual Property Office, the disclosures of which are incorporated herein by reference.

BACKGROUND OF THE INVENTION

1. Field of the Invention

The present invention relates to an apparatus and a method of stabilizing an operation of a disc driver, and more particularly, to an apparatus and a method of stabilizing an operation of a disc driver in a section to set a conversion between a read mode and a write mode of the disc driver.

2. Description of the Related Art

Generally, in disc drivers, an output level of a laser diode is higher in a write mode than in a read mode because more power is necessary to drive the laser diode in the write mode than in the read mode. Accordingly, where servo error signals (i.e., a tracking error (TE) signal and a focusing error (FE) signal), which are generated from light reflected from a disc, are indiscriminately used in the write and read modes, an operation of the disc drivers is not stable.

To maintain levels of servo driving signals (i.e., tracking of drive (TOD) and focus of drive (FOD)) constant in both read and write modes, a gain of the servo error signal needs to be reduced and an offset needs to be adjusted where the read mode is converted into the write mode. Where the write mode is converted into the read mode, the gain and offset need to be restored to an original state. Accordingly, during a mode conversion, a section is required to set the gain and offset is required. This section is referred to as a mode conversion setting section.

However, where a pulse of the servo error signal generated during the mode conversion setting section changes remarkably due to a rapid change in a power level, a pickup jumps to another track and records data in a wrong section, or a defocus occurs, causing data to be lost or overwritten.

SUMMARY OF THE INVENTION

Accordingly, it is an object of the present invention to provide an apparatus and a method of stabilizing an operation of a disc driver in a mode conversion setting section.

Another object of the present invention to provide an apparatus and a method of stabilizing an operation of a disc driver by controlling levels of servo error signals such as a tracking error (TE) signal and a focusing error (FE) signal in a mode conversion setting section without a time delay.

Yet another object of the present invention to provide an apparatus and a method of stabilizing an operation of a disc driver by processing a mode conversion setting mode as a defective section so as to hold an operation of a pickup driver.

Additional objects and advantages of the invention will be set forth in part in the description which follows and, in part, will be obvious from the description, or may be learned by practice of the invention.

To achieve the above and other objects, an embodiment of the present invention is, an apparatus which stabilizes an operation of a disc driver, the apparatus comprising a pickup which reads information from a disc that is received by the disc driver, a filter which performs a low-pass filtering of a servo error signal that is generated during an operation of the pickup, a selector which selects one of the servo error signal and the low-pass filtered servo error signal from the filter and outputs the selected servo error signal to drive the pickup using the selected servo error signal, and a control signal generator which generates a control signal to control the selector to select the low-pass filtered servo error signal in a mode conversion setting section of the disc driver.

The servo error signal may include a tracking error signal and a focusing error signal, and the filter may separately filter the tracking error signal and the focusing error signal.

The control signal generator may generate the control signal to control the selector to select the low-pass filtered servo error signal in response to a mode signal, which indicates a conversion of the disc driver into a write mode and which is generated in an active state of the disc driver.

The control signal generator may include a signal filter which performs a low-pass filtering of the mode signal, which indicates a conversion of the disc driver into a write mode, from an ENDEC (encoder and decoder) that is provided within the disc driver, and a logic device which combines the mode signal indicating the conversion into the write mode and the filtered signal output from the signal filter, and outputs a result of combination as the control signal for the selector.

To achieve the above and other objects, according to another embodiment of the present invention, an apparatus which stabilizes an operation of a disc driver, the apparatus comprising a pickup which reads information from a disc that is inserted into the disc driver and outputs a radio frequency, a driver which drives the pickup, a radio-frequency signal processor which outputs a defect signal that indicates an existence of a defect in the disc according to the output radio frequency signal, a digital signal processor which generates another defect signal that indicates the existence of the defect in response to the defect signal being received in an active state of the disc driver, a servo controller which holds the driver in response to the another defect signal, and a controller which controls the defect signal, which is transmitted from the radio-frequency signal processor to the digital signal processor, to be in the active state in a mode conversion setting section of the disc driver.

The controller may control the defect signal that indicates the existence the defect to be set to the active state in response to a mode signal, indicating a conversion of the disc driver into a write mode, being generated in the active state of the disc driver.

To achieve the above and other objects, according to a further embodiment of the present invention, a method of stabilizing an operation of a disc driver having a pickup, the method comprising performing a low-pass filtering of a servo error signal that is generated during the operation of the disc driver, controlling an operation of the pickup using the low-pass filtered servo error signal in a mode conversion setting section of the disc driver, and controlling the operation of the pickup using the unfiltered servo error signal in a section other than the mode conversion setting section.

To achieve the above and other objects, yet another embodiment of the present invention includes, a method of stabilizing an operation of a disc driver having a pickup, the method comprising controlling a defect signal indicating an existence of a defect during the operation of the disc driver to indicate the existence of the defect in response to a mode signal, which indicates a mode conversion setting section of the disc driver being generated in a active state of the disc driver, and holding an operation of the pickup in response to the defect signal which is being generated in a state indicating the existence of the defect.

BRIEF DESCRIPTION OF THE DRAWINGS

These and other objects and advantages of the present invention will become apparent and more readily appreciated from the following description of the embodiments, taken in conjunction with the accompanying drawings of which.

DETAILED DESCRIPTION OF THE PREFERRED EMBODIMENTS

Figure 1:
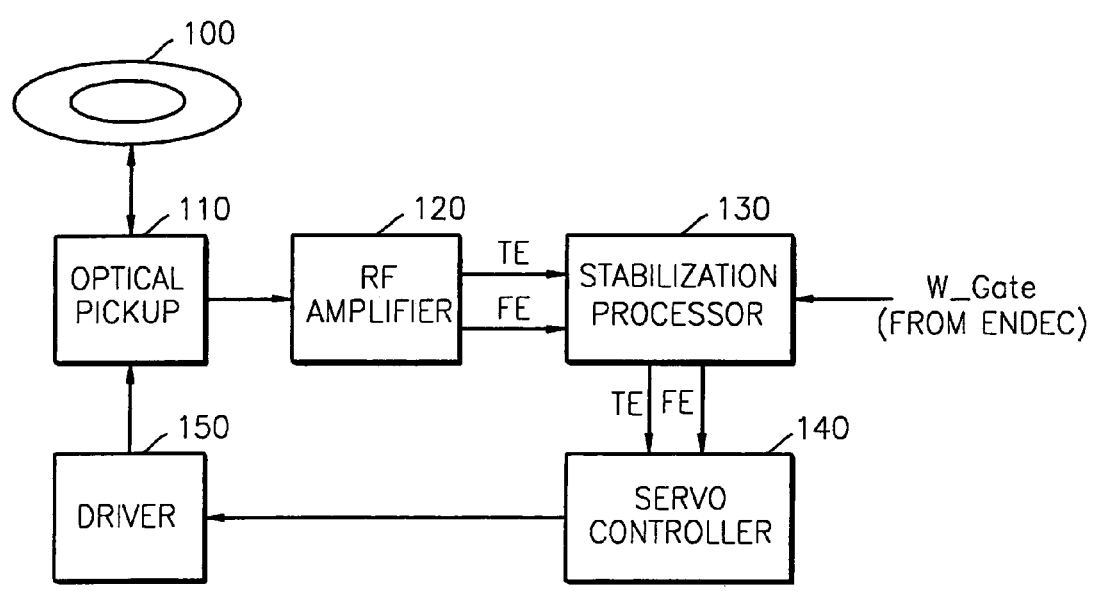
FIG. 1 is a block diagram of a disc driver having an apparatus which stabilizes an operation of the disc driver, according to an embodiment of the present invention.

Reference will now be made in detail to the embodiments of the present invention, examples of which are illustrated in the accompanying drawings, wherein like reference numerals refer to the like elements throughout. The embodiments are described below in order to explain the present invention by referring to the figures.

FIG. 1 shows a functional block diagram of a disc driver having an apparatus which stabilizes an operation of the disc driven, according to an embodiment of the present invention. Referring to FIG. 1, the disc driver includes an optical pickup 110 for a disc 100, a radio frequency (RF) amplifier 120, a stabilization processor 130, a servo controller 140, and a driver 150.

The disc 100 is, for example, an optical medium such as a compact disc (CD) or a digital versatile disc (DVD).

Where the disc 100 is rotated, the optical pickup 110 radiates light at the disc 100, receives the light reflected from the disc 100, converts the received light into an RF signal in an analog form, and outputs the RF signal. The optical pickup 110 may be referred to as a pickup.

The RF amplifier 120 amplifies the RF signal transmitted from the optical pickup 110 to a predetermined level. Here, the RF amplifier 120 generates servo error signals, such as a tracking error (TE) signal and a focusing error (FE) signal, based on the RF signal from the optical pickup 110. One of many methods known or to be developed can be used to generate the FE signal and the TE signal based on the RF analog signal.

The stabilization processor 130 stabilizes the TE signal and the FE signal from the RF amplifier 120 in a mode conversion setting section using a write gate signal $W_{13}$ Gate received from an ENDEC (encoder & decoder) (not shown), which is provided within the disc driver. The ENDEC is used where data is recorded in a disc. The ENDEC encodes data transmitted from a host computer (not shown) to conform to the specifications of the disc 100 and outputs a variety of signals necessary for recording. For the above operations, the stabilization processor 130 has a structure shown in FIG. 2.

Figure 2:
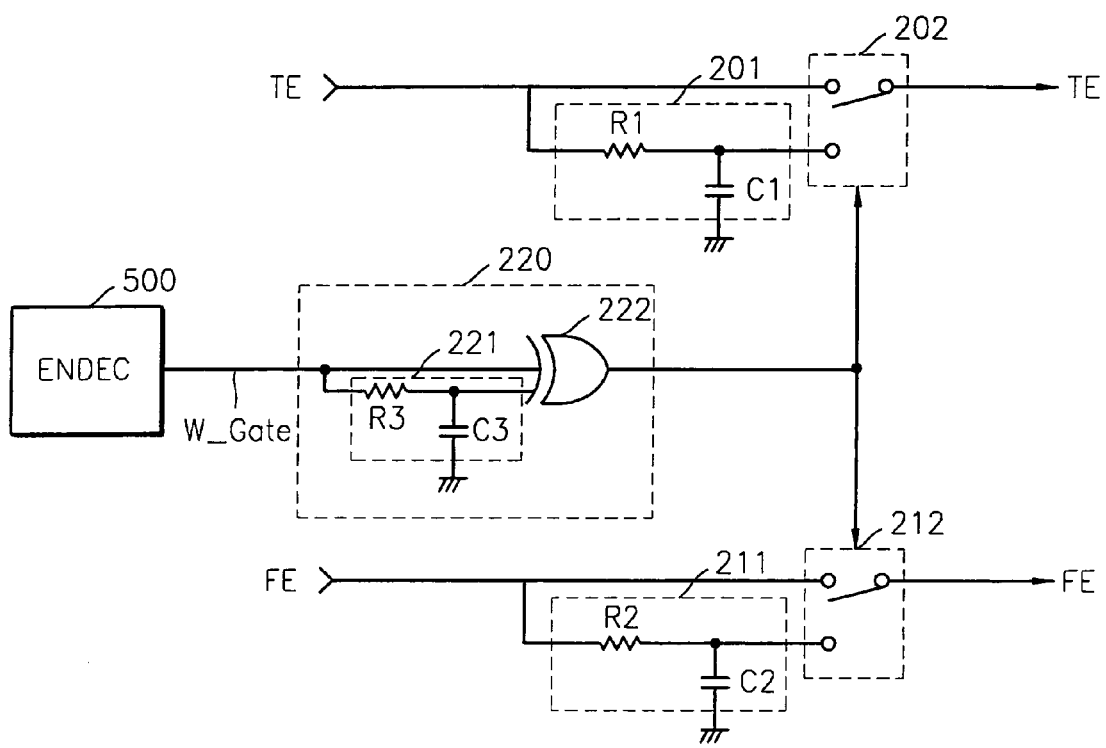
FIG. 2 is a circuit diagram of a stabilization processor shown in FIG. 1.

FIG. 2 shows a circuit diagram of the stabilization processor 130 of FIG. 1 Referring to FIG. 2, the stabilization processor 130 includes low-pass filters 201 and 211, switches 202 and 212, and a control signal generator 220 which generates a signal to control operations of the switches 202 and 212.

The low-pass filter 201 includes a resistor R1 and a capacitor C1, and performs a low-pass filtering of the TE signal from the RF amplifier 120. The switch 202 selects and outputs either the TE signal from the RF amplifier 120 or the filtered TE signal from the low-pass filter 201. The selection operation of the switch 202 is controlled by a control signal generated from the control signal generator 220.

The low-pass filter 211 includes a resistor R2 and a capacitor C2, and performs a low-pass filtering of the FE signal from the RF amplifier 120. The switch 212 selects and outputs either the FE signal from the RF amplifier 120 or the filtered FE signal from the low-pass filter 211. The selection operation of the switch 212 is controlled by a control signal generated from the control signal generator 220.

According to a control signal generated from the control signal generator 220, the switches 202 and 212 select the filtered servo error signals, such as TE and FE signals, transmitted from the low-pass filters 201 and 211, respectively, in a mode conversion setting section of the disc driver. The switches 202 and 212 also select the servo error signals, i.e., TE and FE signals, respectively, transmitted from the RF amplifiers 120 in a section other than the mode conversion setting section. The switches 202 and 212 constitutes a selector which selects one of the servo error signals. The servo error signals, i.e., TE and FE signals, output from the switches 202 and 212 are transmitted to the servo controller 140.

The control signal generator 220 includes a filter 221, which performs a low-pass filtering of a write gate signal W_Gate from an ENDEC 500, and a logic device 222, which exclusively ORs a signal output from the filter 221 and the write gate signal W_Gate from the ENDEC 500, and outputs the result of ORing as a control signal to control the operations of the switches 202 and 212. The write gate signal W_Gate indicates whether to convert the disc driver into a write mode. In other words, the write gate signal W_Gate in an active state indicates that the disc driver is converted into a write mode. The filter 221 includes a resistor R3 and a capacitor C3.

Referring back to FIG. 1, the servo controller 140 provides servo driving signals, i.e., FOD and TOD, to the driver 150 according to the servo error signals, i.e., the TE and FE signals, transmitted from the stabilization processor 130. The driver 150 drives the optical pickup 110 according to the servo driving signals.

A method of stabilizing an operation of the disc driver shown in FIGS. 1 and 2 is described herein below.

During an operation of the disc driver, where the RF amplifier 120 generates servo error signals, i.e., a TE signal and a FE signal, a low-pass filtering is performed on the servo error signals. Next, where the disc driver is in a mode conversion setting section, the filtered servo driving signals filtered according to the low-pass filtered servo error signals are transmitted to the driver 150 to control an operation of the optical pickup 110. Accordingly, the filtered servo error signals can prevent rapid changes in the mode conversion setting section. In a section other than the mode conversion setting section, the operation of the optical pickup 110 is controlled using the unfiltered servo error signals output from the RF amplifier 120.

Figure 3:
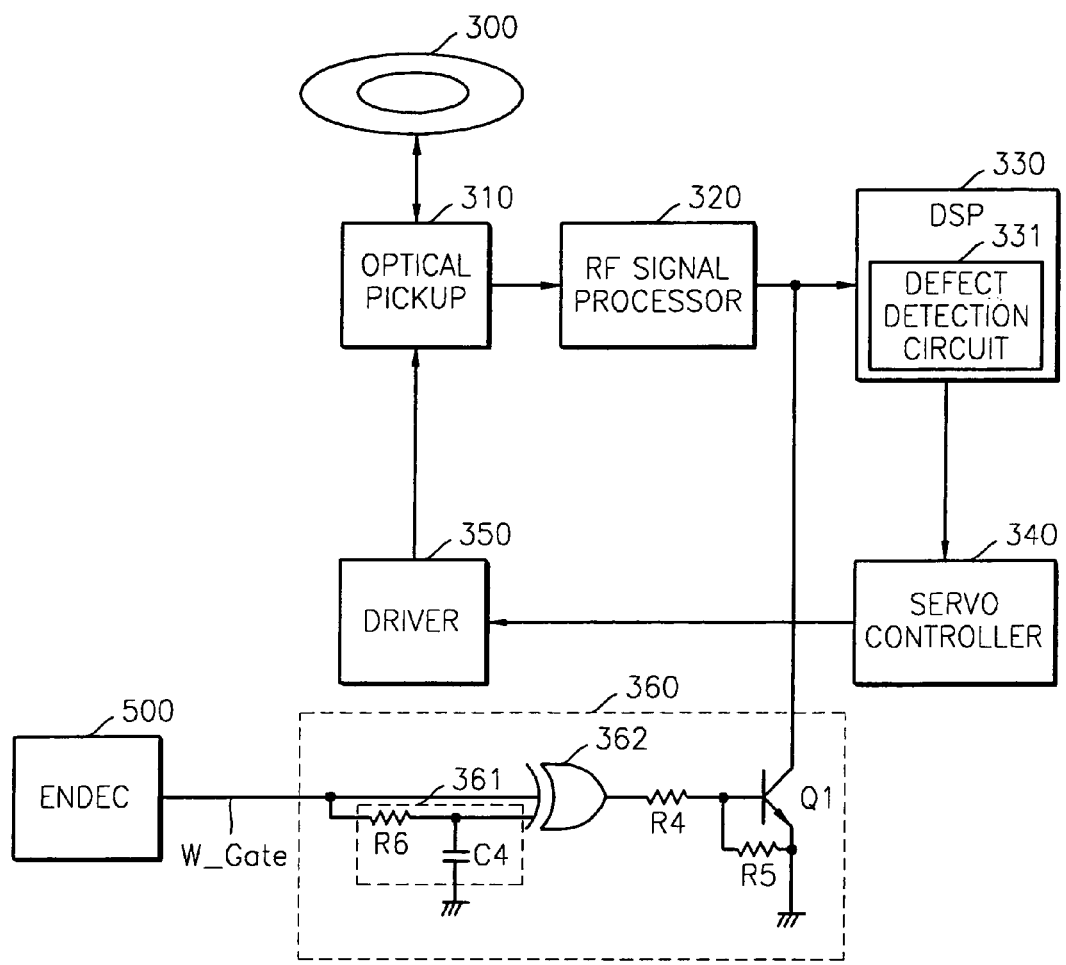
FIG. 3 is a block diagram of a disc driver having an apparatus which stabilizes an operation of the disc driver, according to another embodiment of the present invention.

FIG. 3 shows a functional block diagram of a disc driver having an apparatus which stabilizes an operation of the disc driver, according to another embodiment of the present invention. The disc driver includes an optical pickup 310 for a disc 300, an RF signal processor 320, a digital signal processor (DSP) 330, a servo controller 340, a driver 350, and a controller 360. The disc 300 and the optical pickup 310 are the same as the disc 100 and the optical pickup 110, respectively, shown in FIG. 1.

The RF signal processor 320 amplifies an RF analog signal transmitted from the optical pickup 310 to a predetermined level and outputs a signal, for example, a side beam add (SBAD) signal, to indicate an existence or nonexistence of a defect of the disc 300, based on the RF analog signal. The signal which indicates the existence or nonexistence of the defect is transmitted to the DSP 330.

The DSP 330 includes a defect detection circuit 331. The defect detection circuit 331 generates a signal to indicate a detection of the defect according to the state of the signal which indicates the existence or nonexistence of the defect transmitted from the RF signal processor 320. In other words, where the signal which indicates the existence or nonexistence of the defect is applied in an active state, the defect detection circuit 331 generates a signal indicating that the defect is detected from the disc 300. In a case where the signal which indicates the existence or nonexistence of the defect is applied in an active state, where the signal has a low level, the defect detection circuit 331 generates a signal indicating that the defect is detected from the disc 300.

In response to the signal indicating the existence of the defect received from the DSP 330, the servo controller 340 holds an operation of the driver 350. A hold section is the same as a section in which the signal indicating the existence of the defect is applied in an active state. Then, the driver 350 controls the optical pickup 310 to be maintained in a current state. The current state of the optical pickup 310 means, for example, an operating state before a mode conversion setting section.

The controller 360 controls the state of the signal, which indicates the existence or nonexistence of the defect, and which is transmitted from the RF signal processor 320 to the DSP 330 in the mode conversion setting section, using a write gate signal W_Gate. The write gate signal W_Gate is transmitted from an ENDEC 500. In other words, the controller 360 controls the signal, which indicates the existence or nonexistence of the defect to be in an active state, in the mode conversion setting section. The controller 360 does not control the state of the signal, which indicates the existence or nonexistence of the defect, in a section other than the mode conversion setting section.

For the above operations, the controller 360 includes a filter 361 which performs a low-pass filtering of the write gate signal W_Gate, a logic device 362 which exclusively ORs the write gate signal W_Gate and the low-pass filtered write gate signal output from the filter 361, and a transistor Q1 which switches according to an output signal of the logic device 362.

The filter 361 includes a resistor R6 and a capacitor C4. A base and emitter of the transistor Q1 are connected to bias resistors R4 and R5, respectively.

Where the write gate signal W_Gate in an active state is applied, the transistor Q1 is turned on by the signal output from the logic device 362 so that the defect signal, which indicates the existence or nonexistence of the defect and which is transmitted from the RF signal processor 320 to the DSP 330, is set to a low active state. However, where the write gate signal W_Gate in an inactive state, the transistor Q1 is turned off by the signal output from the logic device 362 so that the controller 360 does not exert any influence on the state of the defect signal.

The write gate signal W_Gate is the same as that described in FIG. 1. Accordingly, where the write gate signal W_Gate is converted from an inactive state into an active state, the disc driver converts from a read mode into a write mode. Where the write gate signal W_Gate is converted from the active state into the inactive state, the disc driver converts from the write mode into the read mode.

A method of stabilizing an operation of the disc driver shown in FIG. 3 is described herein below.

Where the write gate signal W_Gate indicating the mode conversion setting section of the disc driver is applied in the active state, the signal which indicates the existence or nonexistence of the defect during an operation of the disc driver is controlled to indicate the existence of the defect. In other words, as described in FIG. 3, the signal which indicates the existence or nonexistence of the defect is forcedly set to a low active state. Thus, the servo controller 340 holds an operation of the driver 350 so as to maintain the optical pickup 310 in a current state. As described above, by holding the operation of the driver 350 in the mode conversion setting section, a defocus and detrack due to a sudden change in a pulse of a servo error signal can be prevented.

According to the present invention, where a conversion between a read mode and a write mode occurs during an operation of a disc driver, a level of a servo error signals is controlled in a mode conversion setting section without a time delay so as to prevent a defocus and a detrack from occurring in the mode conversion setting section. In addition, the mode conversion setting section is processed as a defective section to forcedly hold an operation of a driver, which drives a pickup, so as to prevent a defocus and a detrack without errors.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A method of stabilizing an operation of a disc driver having a pickup, the method comprising:
controlling a defect signal indicating an existence of a defect in the disc driver to be in an active state indicating the existence of the defect during the operation of the disc driver in response to a mode signal, when the mode signal is in an active state,
wherein the mode signal indicates a mode conversion setting section of the disc driver; and
holding the operation of the pickup in response to the defect signal which is being generated in a state indicating the existence of the defect.

2. The method of claim 1, wherein the mode signal is in an active state when operation of the disc driver is changed from a read mode to a write mode.

3. An apparatus which stabilizes an operation of a disc drive having a pickup, the apparatus comprising:
a controller which controls a defect signal indicating an existence of a defect in the disc driver to be in an active state indicating the existence of the defect during operation of the disc driver in response to a mode signal, when the mode signal is in an active state,
wherein the mode signal indicates a mode conversion setting section of the disc driver; and
a server controller which holds a driving of the pickup, when the defect signal is in the active state.

4. The apparatus of claim 3, wherein the mode signal is in an active state when an operation of the disc driver is changed from a read mode to a write mode.

5. A method of stabilizing an operation of a disc driver having a pickup, the method comprising:
controlling a defect signal indicating an existence of a defect in the disc driver to be in an active state indicating the existence of a defect during operation of the disc driver in response to a signal indicating a change from a read mode to a write mode; and
holding the operation of the pickup in response to the defect signal which is being generated in a state indicating the existence of the defect.

* * * * *